United States Patent [19]
Siu et al.

[11] Patent Number: 5,441,820
[45] Date of Patent: Aug. 15, 1995

[54] ELECTRICALLY RECHARGED BATTERY EMPLOYING A PACKED/SPOUTED BED METAL PARTICLE ELECTRODE

[75] Inventors: Stanley C. Siu, Alameda; James W. Evans, Piedmont; Juan Salas-Morales, Berkeley, all of Calif.

[73] Assignee: Regents, University Of California, Berkeley, Calif.

[21] Appl. No.: 143,570

[22] Filed: Oct. 26, 1993

[51] Int. Cl.⁶ ............................................. H01M 8/04
[52] U.S. Cl. ........................................ 429/17; 429/15; 429/27; 429/81
[58] Field of Search .................... 429/15, 17, 27, 81

[56] References Cited
U.S. PATENT DOCUMENTS

| | | | |
|---|---|---|---|
| 4,945,011 | 7/1990 | Tanaka | 429/81 |
| 5,006,424 | 4/1991 | Evans et al. | 429/15 |
| 5,208,526 | 5/1993 | Goldman et al. | 429/15 X |

*Primary Examiner*—Prince Willis, Jr.
*Assistant Examiner*—M. Nuzzolillo
*Attorney, Agent, or Firm*—Paul R. Martin

[57] ABSTRACT

A secondary metal air cell, employing a spouted/-packed metal particle bed and an air electrode. More specifically a zinc air cell well suited for use in electric vehicles which is capable of being either electrically or hydraulically recharged.

12 Claims, 3 Drawing Sheets

ELECTRICALLY RECHARGED BATTERY EMPLOYING A PACKED/SPOUTED BED METAL PARTICLE ELECTRODE

The invention described herein was made with Government support under Contract No. DE-AC03-76SF00098 between the U.S. Department of Energy and the University of California for the operation of Lawrence Berkeley Laboratory. The Government has certain rights in this invention.

FIELD OF THE INVENTION

The present invention relates to a rechargeable battery, in particular a zinc-air cell having a zinc particle bed and a bifunctional air electrode. More specifically the invention relates a cell which is capable of being either electrically or hydraulically recharged.

BACKGROUND OF THE INVENTION

There is a substantial and growing interest in the development and use of electric vehicles to alleviate the world's pollution problems and reduce the use of nonrenewable fossil fuels. The biggest problem in the development of such vehicles has been the inadequacy of conventional batteries to provide the energy required by such vehicles.

Zinc-air primary (non-rechargeable) cells and secondary (rechargeable) zinc-air cells have been disclosed which might meet some of the requirements of practical electric vehicles. Ross, U.S. Pat. No. 4,842,963 issued Jun. 27, 1989, describes a secondary zinc-air battery which recirculates electrolyte through porous foam electrode containing deposited zinc by means of an external pump and electrolyte reservoir.

Doniat, et al U.S. Pat. Nos. 3,887,400 issued Jun. 3, 1975, 3,981,747 issued Sep. 21, 1976, and U.S. Pat. No. 4,126,733 issued Nov. 21, 1978, provide another approach to rechargeable zinc-air cells. In these systems electrolyte is passed upwardly through a zinc particle bed. Various techniques for electrochemically regenerating the zinc in situ are also described.

Solomon, et al. U.S. Pat. No. 4,147,839 issued Apr. 3, 1979, describes a cell using a stirred metal powder and cell electrolyte slurry. While not requiring the use of a pump during discharge to transfer electrolyte to and from the cell, the battery still must draw energy during discharge in order to drive the cell's agitator which in this case is a pitched impeller used to stir the mixture.

A problem with currently available systems is that pumps are required to recirculate the electrolyte through external loops during discharge. Pumps consume a substantial amount of energy and add considerable weight to the battery. This makes the presently available zinc air cells poorly suited for electric vehicles as a large number of such cells are necessary to provide adequate power.

Savaskan and Evans, U.S. Pat. No. 5,006,424 issued Apr. 9, 1991 describes a cell which has demonstrated promising electrical performance. Besides its electrical performance, this cell is attractive because it is "hydraulically" recharged. The zinc is present as particles and recharging consists of the hydraulic removal of reacted particles and electrolyte at a service station. Replenishment could be accomplished in a matter of minutes in a manner similar to refueling procedures used with internal combustion engine vehicles.

The disadvantage to the use of hydraulically recharged cells in electric cars is that they require service stations to replenish the zinc particles and electrolytes in a market acceptable manner. The difficulty of establishing the infrastructure of such refueling stations makes the practical, broad application of hydraulically recharged cells less attractive.

For the above as well as other reasons the ability to electrically recharge, at home or in electrical recharging stations is important for the practical general use of electric cars. Because the present invention meets this challenge by being capable of both electric and hydraulic recharging, it represents a dramatic breakthrough in the development of electric vehicles. Zinc-air cells as described in this application would offer significant advantages over presently available batteries.

SUMMARY OF THE INVENTION

The present invention is a secondary zinc air battery which can be either electrically or hydraulically recharged.

It is an object of the present invention to provide a cell with electrical performance characteristics which can provide for the development of practical electric vehicles.

It is another object of the present invention to provide a cell which can be readily combined with other cells for use in an electric vehicle.

It is a further object of the present invention to provide a cell which can be easily manufactured.

It is another object of the present invention to provide a cell which can be manufactured from inexpensive, readily available materials.

It is another object of the present invention to provide a cell whose employment is safe and environmentally sound.

It is another object of the present invention to provide a cell the manufacture of which is environmentally sound.

These and other objects and features of the invention will become more fully apparent when the following detailed description of the invention is read in conjunction with the accompanying drawings.

DETAILED DESCRIPTION OF THE INVENTION

The present invention is a secondary battery which is provided with an inventive metal particulate anode and a bifunctional air electrode. During electrical discharge of the cell, metal particles form a packed particle bed. Zinc is the preferred particle material for the present invention. Recharging the cell takes place either through the hydraulic replacement of spent electrolyte and particles or by recirculating the electrolyte and reversing the current to electrically recharge the cell.

Cell Construction

Figure 1:
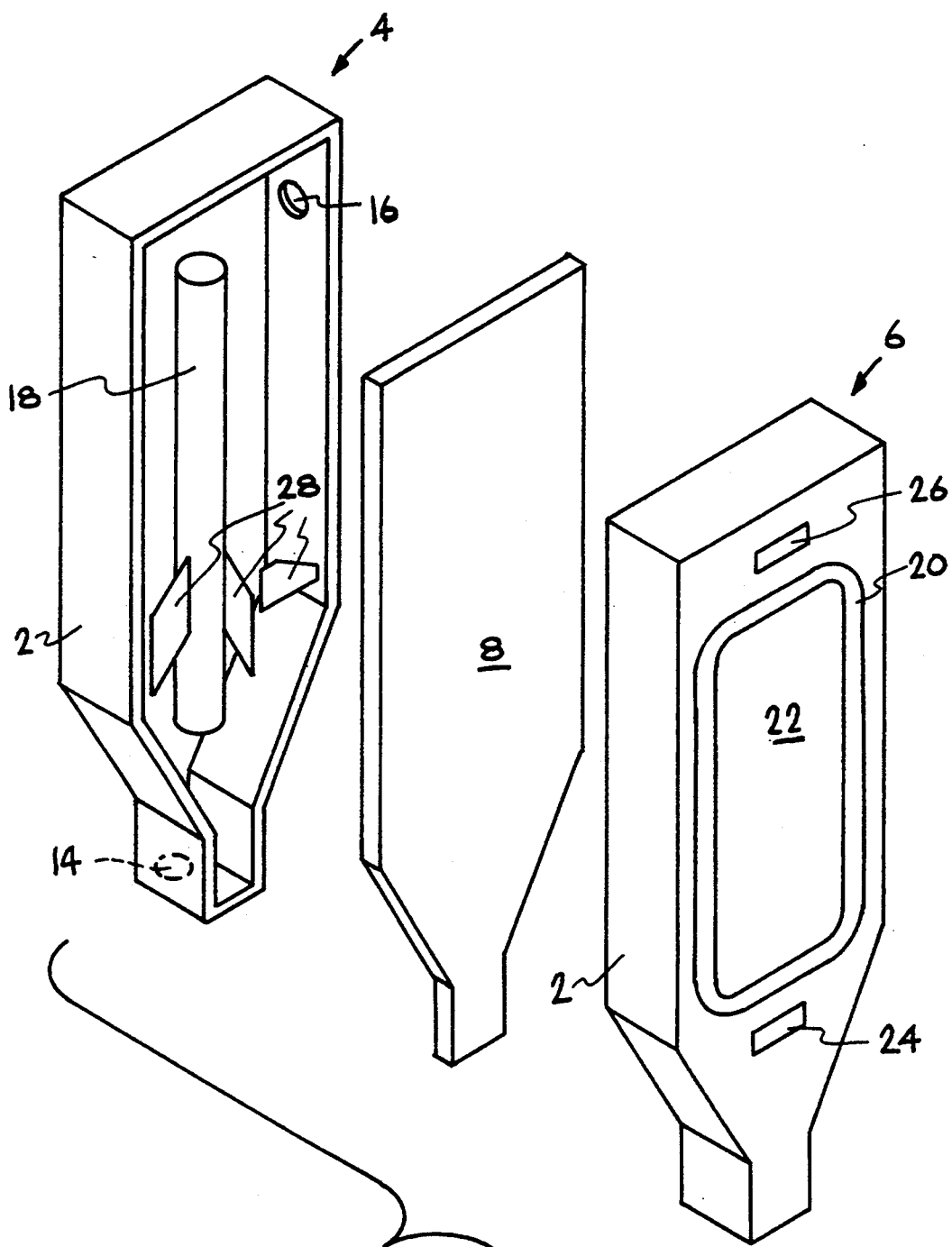
FIG. 1 is an exploded three quarters view of the inventive cell.
Figure 2:
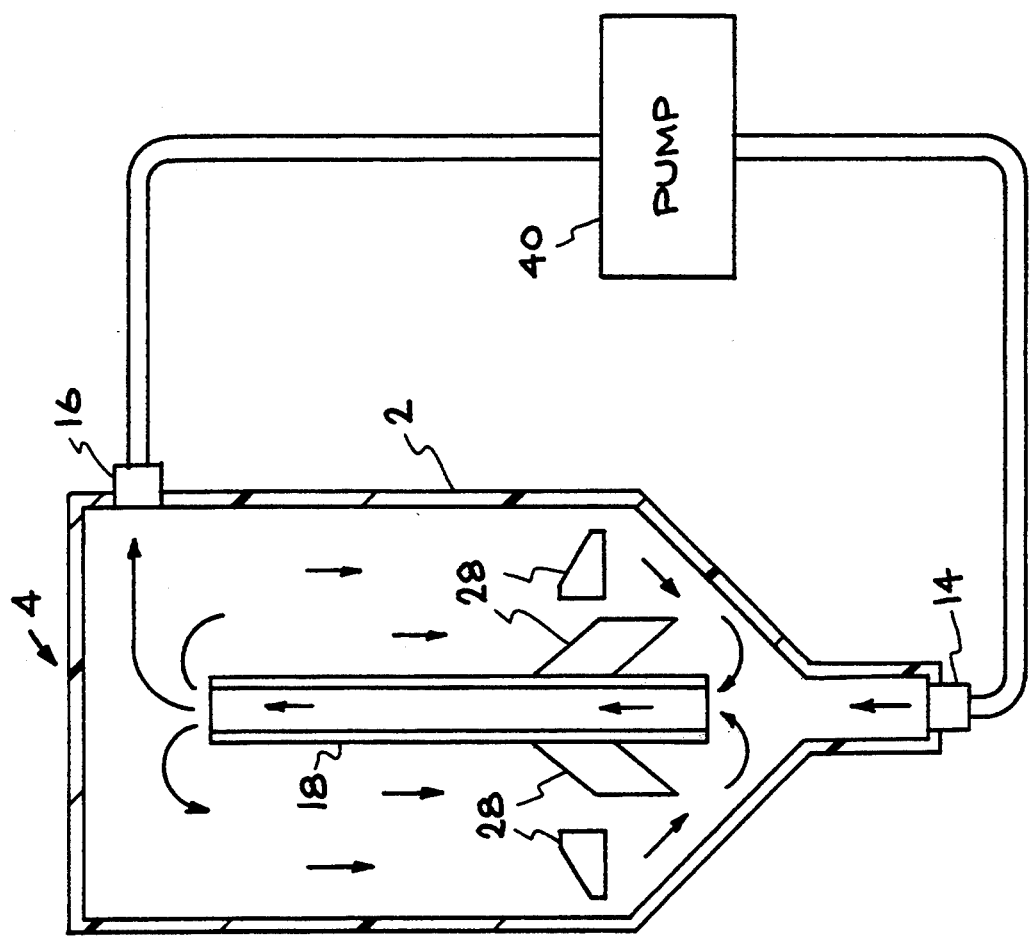
FIG. 2 is a cross-sectional view of the anode side of the inventive cell showing the cell and its internal flow patterns during electrical recharge.
Figure 1A:
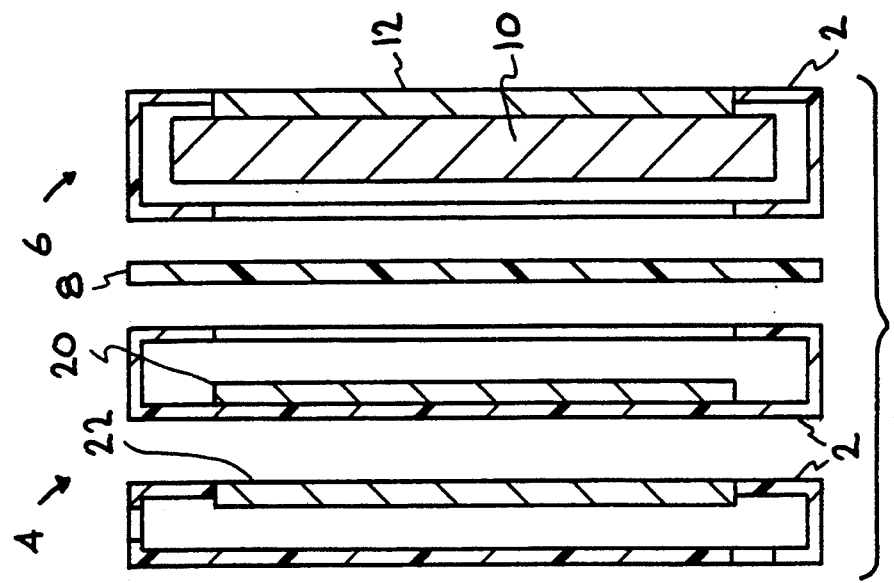
FIG. 1a is an exploded side view of the inventive cell.
Figure 3:
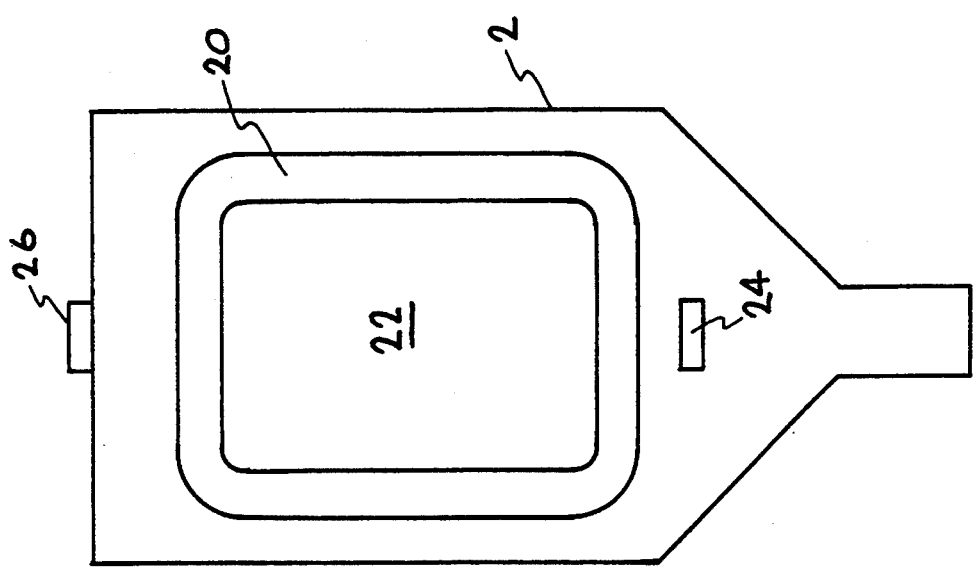
FIG. 3 is a cross-sectional view of the cathode side of the inventive cell

As seen in FIGS. 1 and 1a, the cell of the present invention is comprised in its most general form of a plastic or ceramic cell casing 2 divided into two sides, that is an anode side 4, shown in detail in FIG. 2 and a cathode side 6, shown in detail in FIG. 3. FIGS. 1 and 1a show separating membrane 8 which divides and separates the two sides. The anode side 4 of the cell casing 2 contains a metal particle bed 10 as shown in FIG. 1a, a current collector/feeder 12 (in contact with the particle bed 10), as shown in FIG. 1a, an electrolyte recirculation inlet 14 at the bottom of the cell and an electrolyte recirculation outlet 16 at the top.

FIG. 2 illustrates the connection of electrolyte inlet 14 and electrolyte outlet 16 are to a pump 40 which is employed to circulate electrolyte and metal particles through the cell during electrical recharge. Some embodiments of the inventive cell may employ the pump during discharge or hydraulic recharge. In the center of the anode side 4, of the cell casing 2, in line with the electrolyte recirculation inlet 14 at the bottom of the casing 2 there is provided a draft tube 18 running up the central axis of the cell. On either side of the draft tube at its bottom end there is provided a series of flow baffles 28. These baffles 28 serve to enhance particle flow through the anode side 4 of the cell.

Figure 4:
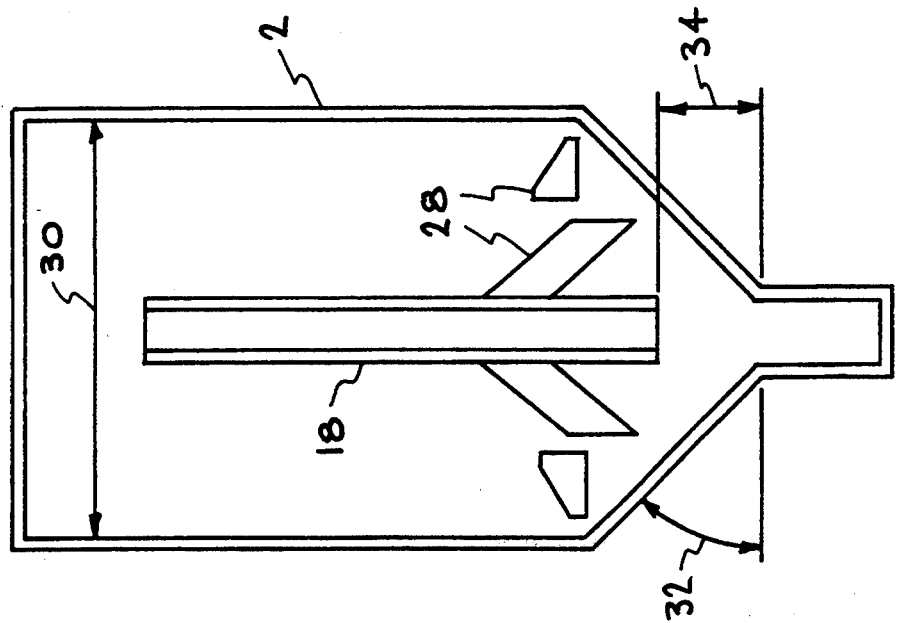
FIG. 4 is a cross-sectional view of the anode side of the inventive cell showing dimension lines for the cell casing and draft tube.

As illustrated in FIG. 4, the placement of the baffles 28 is dependent upon the cell width 30, the slope of the cell bottom 32, and the position of the draft tube 18. The width of the baffles 28 can range from 5 to 30 mm with a separation of 3 to 10 mm. It is also possible to design a cell which does not require flow baffles 28.

The cross-sectional area and placement of the draft tube 18 is dependent upon the width of the cell 30 and the velocity of the electrolyte being pumped through the cell. The cross sectional area of the draft tube 18 can vary from 0.20 to 10 sq. cm. The height 34 of the tube relative to the bottom of the cell may vary from 10–50 mm.

The cathode side 6 of the cell casing 2 shown in FIG. 3 contains a bifunctional air electrode 20 (preferably in direct contact with the separating membrane 8), a current collector/feeder 22 (in contact with the air electrode 20), an air inlet 24, and an air outlet 26.

As shown in FIGS. 1 and 1a, both sides of the cell are completely separated from each other either by the separating membrane 8 or the walls of the cell casing 2 or draft tube 18. The entire cell is sealed except for the air inlet 24 and outlet 26, the electrolyte recirculation inlet 14, and outlet 16.

Zinc or a zinc alloy is the preferred anode material for the inventive cell. Its many advantages are further increased when used in conjunction with an alkaline electrolyte. Other metals such as aluminum and iron can also be effectively employed and several embodiments of the present invention include the use of these materials as well.

The inventive cell is charged with a bed of active metal particles and an appropriate electrolyte. These particles are formed by coating conducting electrolyte inert carrier particles with zinc or another appropriate metal. Particles may range in size from 0.05 mm to 2.0 mm and in shape from needles to nearly spherical particles commonly referred to as "shot".

A bifunctional air electrode is employed as the cathode in one embodiment of the present invention. Such bifunctional air electrodes are capable of being used during both discharge and electrical recharge of the cell. This type of cathode is typically carbon based. A suitable cathode is the BF-9 bifunctional air electrode from Electro-Media Corporation. A bifunctional electrode is one which is designed to be used during both discharge and recharge of the cell.

Alternatively, a design using a monofunctional air electrode in conjunction with a third electrode located on the cathode side of the cell may be employed. A monofunctional air electrode is designed for use only during the discharge of the cell and the third electrode is one designed for used during recharge. The discharge performance of a monofunctional air electrode is improved over that of a bifunctional electrode.

The electrolyte used in the inventive cell is selected so as to have a high electrical conductivity and a high solubility for the metal discharge products. For use with a zinc anode, the electrolyte chosen should have a high solubility for zincate ions. An electrolyte consisting 30% to 45% by weight KOH and water is appropriate for a zinc air cell such as the one described by the present invention. zincate solubility can be increased through the addition of LiOH, sorbitol or any of a number of other additives.

The current feeder/collectors 12 and 22 as seen in FIG. 1a are selected from among those materials having a high electrical conductivity and which are inert to the electrolyte. Copper is a suitable collector/feeder material. A 1/32 inch thick copper plate would be appropriate for use in the anode side 4 containing the metal particle bed 10. Copper mesh has proved to be an appropriate material for the cathode side 6 containing the air electrode 20. Graphite is another suitable collector/feeder material.

As FIGS. 1 and 1a, the separating membrane 8 in the present invention is formed of a porous insulation material. The membrane 8 allows the current carrying cations and anions to flow from one side of the cell to the other and keeps the metallic material on the anode side 4 of the cell from contacting the air electrode 20 on the cathode side 6. This keeps the cell from shorting out. The material sold under the trademark Celgard 5550 makes an appropriate separating membrane 8. Other suitable materials are also available.

A battery for an electric vehicle using a number of cells of the type herein described defines certain parameters for the construction of the cells. For electric vehicles and other applications requiring high power densities, a thin cell is required in order to maximize the surface area of the electrodes and thus obtain high power densities.

Referring to FIG. 1a, the present inventive cell lends itself to such an application because they can be constructed very thin and connected in series by joining the current collector/feeder from the anode side 12 of one cell to the cathode side current collector/feeder 22 of another cell. Referring to FIG. 1, in one embodiment of the invention, all of the electrolyte inlets 14 and electrolyte outlets 16 are connected so as to form a single path connecting multiple cells through which electrolyte is pumped during recharge.

Referring to FIG. 2, a range of possible metal particle bed 10 thicknesses that this cell can effectively operate under is from around 2 to 40 mm with a bed height ranging from 6 to 80 cm.

The size of metal particle that can be used in the cell can range from 0.05 mm to 2.0 mm. In one embodiment of the inventive cell, a mixture of particle shapes (e.g.

needles, spheres, shot, etc.) and sizes can be used. It is only necessary that the particles be able to flow freely in the anode side of the cell and still not be able to cross over the separating membrane 8 to the cathode side 6 as seen in FIGS. 1 and 1a.

Discharge

During operation of the inventive cell, zinc dissolves into the electrolyte, resulting in a redox reaction. An electrical current is produced by this reaction in the current collector/feeders 12 and 22, as shown in FIG. 1a. Simultaneously, the suspended metal discharge products are also dissolved in the electrolyte and form a high density solution in the interstices of the particle bed 10 as shown in FIG. 2. This denser solution sinks towards the bottom of the cell, generating convection forces. These forces send the less dense active electrolyte material upwards through the draft tube 18 towards the top of the metal particle bed 10, zinc continues to be dissolved and produce current.

Recharge

As previously described, recharging the inventive cell may be achieved hydraulically or electrically. In one embodiment of the present invention electrical recharging is accomplished in conjunction with a pump 40 as seen in FIG. 2 connected to the top and bottom of the cell at the electrolyte outlet 16 and the electrolyte inlet 14. The pump 40 can be located within the device utilizing the battery or externally as a component of a recharging station. The pump 40 recirculates electrolyte up through the draft tube 18 resulting in the particle bed becoming a "spouted bed". For the purposes of the present invention, a spouted bed is one where recirculation from a pump 40 causes an upward flow in the electrolyte in the draft tube 18. This upward flow entrains particles and carries them to the top of the particle bed 10 and keeps the bed in constant motion.

As electrolyte gets pumped up the draft tube 18 particles from the bottom are entrained and carried to the top of the bed. At the top of the tube the emerging jet of electrolyte and metal particles slows down. The particles then fall out of the jet onto the top of the particle bed while the electrolyte continues upwards. The electrolyte is then pumped back to the bottom of the cell where the process is repeated.

Through this mechanism the particles in the bed gradually descend while a constant circulation is maintained through the electroactive material. While the bed is being "spouted" a recharging current is passed through the current feeder/collectors. This causes the metal to be electrodeposited onto the carrier particles. The circulation is necessary in order to keep the metal particles from agglomerating during recharge.

Hydraulic recharge of the cell can be accomplished by first increasing the electrolyte inlet flow to such a high velocity that particles will be carried away with the exiting electrolyte. During electric recharge the flow of electrolyte into the cell is restricted so that particles remain in the cell. In a second step, fresh electrolyte and fresh entrained zinc particles are pumped into the cell.

Example 1

The performance of the cell during discharge has been tested both with the pump in operation and without the pump. It was found that when using zinc coated copper particles, the maximum power per unit area of air electrode obtained was about 89 mW/cm$^2$ with the pump off and about 115 mW/cm$^2$ with the pump on.

Example 2

An experiment was performed with pure zinc particles approximately the same size as the zinc coated copper particles in Example 1. The maximum power densities obtained were about 123 mW/cm$^2$ with the pump off and about 134 mW/cm$^2$ with the pump on. It can be concluded that the cell should attain a maximum power density in the range of 115 mW/cm$^2$ with the pump off, the preferred embodiment of the present invention.

It will be recognized by those skilled in the art that this description may not be the only possible description, or the most accurate description of the theory of this device.

We claim:
1. A hydraulically and electrically rechargeable metal air battery comprising:
   a) A cell casing with a separating membrane which defines cell anode and cathode sides,
   b) A metal particle bed disposed uniformly within the anode side of the cell casing,
   c) A current collector/feeder located within the anode side,
   d) An air electrode provided within the cathode side,
   e) A current collector/feeder disposed within the cathode side,
   f) An electrolyte provided uniformly within the anode and cathode sides, and
   g) A series of flow baffles connected to the cell casing within the anode side.
2. The invention as recited in claim 1, additionally comprised of a flow regulator or regulators connected to said cell casing within the anode side.
3. The invention as recited in claim 2, wherein said flow regulator or regulators is a draft tube or tubes connected to said cell casing within the anode side.
4. The invention as recited in claim 1, further provided with a flow promoter connected to said anode side for circulating the electrolyte.
5. The invention as recited in claim 4, wherein said flow promoter is a pump connected to said anode side for circulating the electrolyte.
6. The invention as recited in claim 1, wherein the electroactive material of said metal particle bed is zinc or a zinc alloy.
7. The invention as recited in claim 1, wherein said particles are an electroactive material deposited onto the surface of electrolyte inert carrier particles.
8. The invention as recited in claim 7, wherein the electroactive material deposited onto the carrier particles is zinc or a zinc alloy.
9. The invention as recited in claim 1, wherein said air electrode is bifunctional.
10. The invention as recited in claim 1, wherein said air electrode is monofunctional and a third electrode is provided within the cathode side.
11. The invention as recited in claim 1, wherein said electrolyte is comprised of a potassium hydroxide solution.
12. The battery of claim 1, wherein a plurality of cells are connected in series through said current collector/feeders.

* * * * *